(12) United States Patent
Borzsonyi

(10) Patent No.: US 6,721,674 B2
(45) Date of Patent: Apr. 13, 2004

(54) METHOD AND APPARATUS FOR IN-SITU CALIBRATION OF QUANTITY MEASUREMENT OF A FLUID FLOWING IN A CHANNEL

(76) Inventor: Andras Borzsonyi, Eperszem u. 16, Budapest H-1221 (HU)

( * ) Notice: Subject to any disclaimer, the term of this patent is extended or adjusted under 35 U.S.C. 154(b) by 125 days.

(21) Appl. No.: 10/030,049

(22) PCT Filed: Mar. 13, 2001

(86) PCT No.: PCT/HU01/00030

§ 371 (c)(1),
(2), (4) Date: Jan. 8, 2002

(87) PCT Pub. No.: WO01/69189

PCT Pub. Date: Sep. 20, 2001

(65) Prior Publication Data

US 2002/0138221 A1 Sep. 26, 2002

(30) Foreign Application Priority Data

Mar. 13, 2000 (HU) ................................. 0001142

(51) Int. Cl.⁷ ............................. G01F 1/12; G01F 1/50; G01F 25/00; G01F 27/00; G06F 19/00
(52) U.S. Cl. ................... 702/100; 73/1.16; 73/1.36; 73/195; 73/196; 73/197; 73/198
(58) Field of Search ........................ 702/100; 73/1.16, 73/1.36, 195–198

(56) References Cited

U.S. PATENT DOCUMENTS

| | | | | |
|---|---|---|---|---|
| 899,960 A | * | 9/1908 | Dornin et al. | 73/1.35 |
| 3,457,768 A | * | 7/1969 | Jasek | 73/1.23 |
| 4,649,734 A | * | 3/1987 | Hillburn | 73/1.19 |
| 5,072,416 A | * | 12/1991 | Francisco et al. | 702/100 |
| 5,548,990 A | * | 8/1996 | Northedge | 73/1.34 |
| 5,817,231 A | * | 10/1998 | Souza | 210/96.2 |
| 6,202,484 B1 | * | 3/2001 | Willner et al. | 73/290 V |

* cited by examiner

Primary Examiner—John Barlow
Assistant Examiner—Anthony T. Dougherty
(74) Attorney, Agent, or Firm—Young & Thompson

(57) ABSTRACT

A method and apparatus for in-situ calibration of quantity measurement of a fluid flowing in a channel, in which a device for measuring the volume of the fluid is disconnected from the fluid flow, measuring fluid is accumulated in a pre-determined amount on site of the calibration, this pre-determined amount of measuring fluid is led through the measuring device with a pre-determined volume flow, in the course of which the volume values measured by the measuring device are saved, then the measured volume values and the real values of the fluid led through are compared to each other and, with this, the quantity measurement of the flowing fluid is calibrated.

15 Claims, 4 Drawing Sheets

METHOD AND APPARATUS FOR IN-SITU CALIBRATION OF QUANTITY MEASUREMENT OF A FLUID FLOWING IN A CHANNEL

BACKGROUND OF THE INVENTION

1. Field of the Invention

The invention relates to a method for in-situ calibration of quantity measurement of a fluid flowing in a channel, wherein the amount of the fluid flowing through is measured in a per-se known way by a measuring means. The invention has as its subject in apparatus for in-situ calibration of quantity measurement of a fluid flowing in a channel, too, wherein a flow measuring means measuring the volume of the flowing fluid is arranged in a measuring shaft, and the flow measuring means is coupled to a per-se known data collecting and, preferably, data transmitting electronic unit.

The invention relates to solutions on the field of in-situ calibration of quantity measurement of a fluid including a mobile measuring station which provide metrological results with correct certainty without limitations in an economic way. One of the most significant applications of the invention is the certified, calibrated measurement of the volume of sewage water flowing in channels, these measurements having legal relevance.

2. Description of the Related Art

The measurement as in this invention can be described under the terms of hydraulic conditions as a liquid flow with free surface, sometimes as a full-piped or backwatered flow (the sewer pipe may be filled by the sewage flow or the flow may have a backwater effect) and the flow may be a non-permanent one with free outlet; sedimentation may also occur. Under these conditions, continuing and permanent measurement of flow shall be provided.

The hydraulic conditions as described above can be cooped with by flow-meters such as Parti-Mag II induction flow-meter, Parschall or Venturi-type models. The measuring unit is arranged in a measuring shaft and it often has an automatic, programmable cleaning and washing equipment. The measured values such as volume flow, summarised amounts can be registered locally or they can be forwarded to a remote data transfer system. The usual "black box" of the electronic unit registers the events of the measurement cycle, the operational conditions of the station and it collects measurements data.

It is characteristic for all known solutions that their measuring accuracy cannot be controlled, it is not certified and, further, the measurement methods don't fulfil the legal conditions of a measurement with legal effect. Thus, these measurements are not only uncertain and inaccurate, but they don't have legal relevance, therefore, such actions as accounting, taxation, certified fulfilment cannot be based on them.

According to the well known metrological requirement, the flow-meter to be tested shall be compared to a certified standard, the measuring uncertainty of which is three time less than the measuring uncertainty of the flow-meter to be tested. In the state of the art solutions, this requirement cannot be fulfilled, therefore, calibration is carried out nowadays only in laboratories under artificial conditions, in measuring circles operated with water even for sewage flow-meters as well, and not on the site. As it has been proved, the flow-meters calibrated in laboratories (even the sophisticated induction flow-meters) have a drift and uncertainty (or other malfunction) when used as reference flow-meters without the possibility of control. It has also been proved, that the known flow-meters calibrated with conventional methods will never meet the requirements of the legal regulations or the standards given for reference etalons which are required to produce reliable measurements in all and every minute of the measurement. Thus, the known solutions are not suitable for alone-standing calibration under the condition of the relevant rules and standard.

Another method used for in-situ flow-measurement is the so called "flow profiling" hydraulic method. In this, the flow rate of an open surface water flow is determined by speed measurement in discrete points of the measurement cross-section of the channel with the help of induction flow-meters or Doppler speed gauges resulting the actual parameters of the spatial speed dispersion and from this and from the simultaneous measurement of the water level, the actual water flow rate can be calculated. These values are then compared to the fluid flow rate values displayed by the flow-meter to be tested.

The flow in channels is a gravitational, non-permanent one with open surface, thus, the instantaneous fluid rates in the measurement cross sections of the controlling flow-meter and the flow-meter to be tested are never identical. The difference depends on the amount of change-in-time of the actual flow, and this deviation cannot be reduced onto an acceptable level in a channel with open surface, as with sewage channels the case is. Therefore and because of reasons arising out of the test arrangement as described above, the measurement uncertainty of the known method is considerably high, and is not lower than that of the flow-meter to be tested. Thus, the above mentioned metrological requirement in respect of the measuring uncertainty cannot be satisfied. It is needless to say, that the back-reference to the national measurement etalons cannot be provided, which counteracts to the calibration requirement.

It is quite disadvantageous with known solutions, that the calibrations are never carried out with the operational liquid (e. g. sewage water). The in-line flow-meter removed from its operational position within the channel and transported into the measurement laboratory often suffers from mechanical damages as well. Further, transportation of the flow-meter to a laboratory for calibration does present a considerable risk of pollution and infection. Out of these facts, legal and technical problems may arise with the known methods, as well.

As it will be clear for now, in the prior art, solutions for in-situ calibration of non-stop flow-meters operated under general hydraulic conditions in open surface channels such as sewage channels, e. g. sewage water flow-meters or other liquid flow-meters didn't got previously known, which would satisfy the general metrological requirements based on international rules and standards.

SUMMARY OF THE INVENTION

The main objective of the present invention is to provide a method for in-situ calibration of quantity measurement of a fluid flowing in a channel, preferably for that of sewage water discharged into gravitational sewage channels, resulting in a certified measuring station with permanent, stable and certain measurement accuracy, with which measurements with legal effect can also be realised. The method and the apparatus realising this method shall both be applicable in all (sewage) channels as seen in the practice and with small, middle and high water outputs during the calibrations, and with all flow-meters as known in the state of the art, regardless on the amount and quality of the liquid to be measured.

The basic idea of this invention is to compare the measuring uncertainty of the operational in-line flow-meter on the site of the measurement to the measuring uncertainty of a calibrated working standard etalon.

Hence, according to the invention, in a method for in-situ calibration of quantity measurement of a fluid flowing in a channel, the amount of the fluid flowing through is measured in a per-se known way by a measuring means.

The improvement of the method is in that the measuring means of the volume of the fluid is disconnected from the fluid flow, measuring fluid is accumulated in a certified and pre-determined amount on site of the calibration, this certified and pre-determined amount of measuring fluid is led through the measuring means with a pre-determined volume flow, in the course of which the volume values measured by the measuring means are saved, then the measured volume values and the calibrated standard real values of the fluid led through is compared to each other and, with this, the quantity measurement of the flowing fluid is calibrated.

The invention has as its subject an apparatus for in-situ calibration of quantity measurement of a fluid flowing in a channel, too, wherein a flow measuring means measuring the volume of the flowing fluid is arranged in a measuring shaft, and the flow measuring means is coupled to a per-se known data collecting and, preferably, data transmitting electronic unit.

The improvement of the apparatus is in that it comprises a calibration tank having a officially certified volume and being erected on site of the measurement, said calibration tank being connected to a source of a measuring liquid as well, at its outlet, to a measuring conduit discharging into said channel before the flow-meter seen in direction of flow of liquid within the channel , before calibration, the calibration tank contains measuring fluid in a pre-determined and certified amount, and the measuring conduit has at least one draw-off valve means for controlling the flow of the measuring fluid in a certified way.

Various optional or preferred features are set out in the detailed description forming part of this specification.

Thus, in one exemplified realisation of the method of this invention, the measuring fluid is led through for more than one time, preferably under different flow velocities and flood wave shapes covering the whole measuring range of the measuring means, wherein the velocity range of the change of the volume flow of the flowing fluid permitted for the given measuring means in the given measuring arrangement is determined by experiments before start of the calibration.

It is still preferable, if the fluid flowing in the channel is used as said measuring fluid, and this fluid is gathered in a previously certified measuring container. The fluid flowing in the channel and used as said measuring fluid can preferably be at least partially substituted or completed by a fluid being available on site of the calibration.

In another preferred realisation, the flow of the measuring fluid is controlled or determined by a certified etalon flow-meter before leading the fluid through the measuring means.

It still preferred, if the flow of the measuring fluid is controlled or determined by a certified etalon flow-meter before leading the fluid through the measuring means.

It is prefreable, if the etalon flow-meter is previously calibrated and certified by flowing through the measuring fluid in a certified standard real volume.

In a preferred realisation, the measuring fluid is led through a measuring conduit having the same hydraulic parameters as the channel and the measuring means is connected into this measuring conduit.

In case of a full-piped measuring means, the measuring fluid can be led through said measuring means with flow parameters deferring from that of the gravitational flow. Therein, the certified amount of measuring fluid can also be determined after its passage through the measuring means.

In one exemplified embodiment of the apparatus this invention, the channel has a provisional gate for sealingly blocking the channel for the time of calibration before the flow-meter seen in direction of flow of liquid within the channel .

It is also preferred, according to the invention, that a by-pass conduit is provided to pass by the gate and the measuring shaft.

A further preferred embodiment is wherein a collection reservoir is provided between the calibration tank and the measuring conduit.

It is still another preferred embodiment, wherein an etalon flow-meter is arranged in the measuring conduit.

A further preferred embodiment is wherein the etalon flow-meter is in direct connection with a source of the measuring liquid with the intervention of at least one filler valve.

It is still another preferred embodiment, wherein the measuring conduit has a free surface downstream tank for outflow after the etalon flow-meter seen in direction of flow of the liquid.

It is also preferred, according to the invention, that the flow-meter removed from the measuring shaft is mounted into a measuring pipe after the free surface downstream tank, and the measuring pipe has the same hydraulic parameters as the channel.

Preferably, a full-piped measuring means is provided and the channel is formed as a pressure conduit and a slide valve disconnecting the measuring means out of the pressure conduit is arranged before the measuring means, and connection fitting introducing the measuring liquid into the pressure conduit, preferably under pressure is provided between the slide valve and the measuring means.

It is still another preferred embodiment, wherein a full-piped measuring means is provided and the channel is formed as a pressure conduit and a slide valve disconnecting the measuring means out of the pressure conduit is arranged after the measuring means, and connection fitting introducing the measuring liquid into the pressure conduit, preferably under pressure is provided between the slide valve and the measuring means.

BRIEF DESCRIPTION OF THE DRAWINGS

Realisations and embodiments of this invention will now be described by way of examples with reference to the accompanying drawings, in which.

DETAILED DESCRIPTION OF THE PREFERRED EMBODIMENTS

Figure 1:
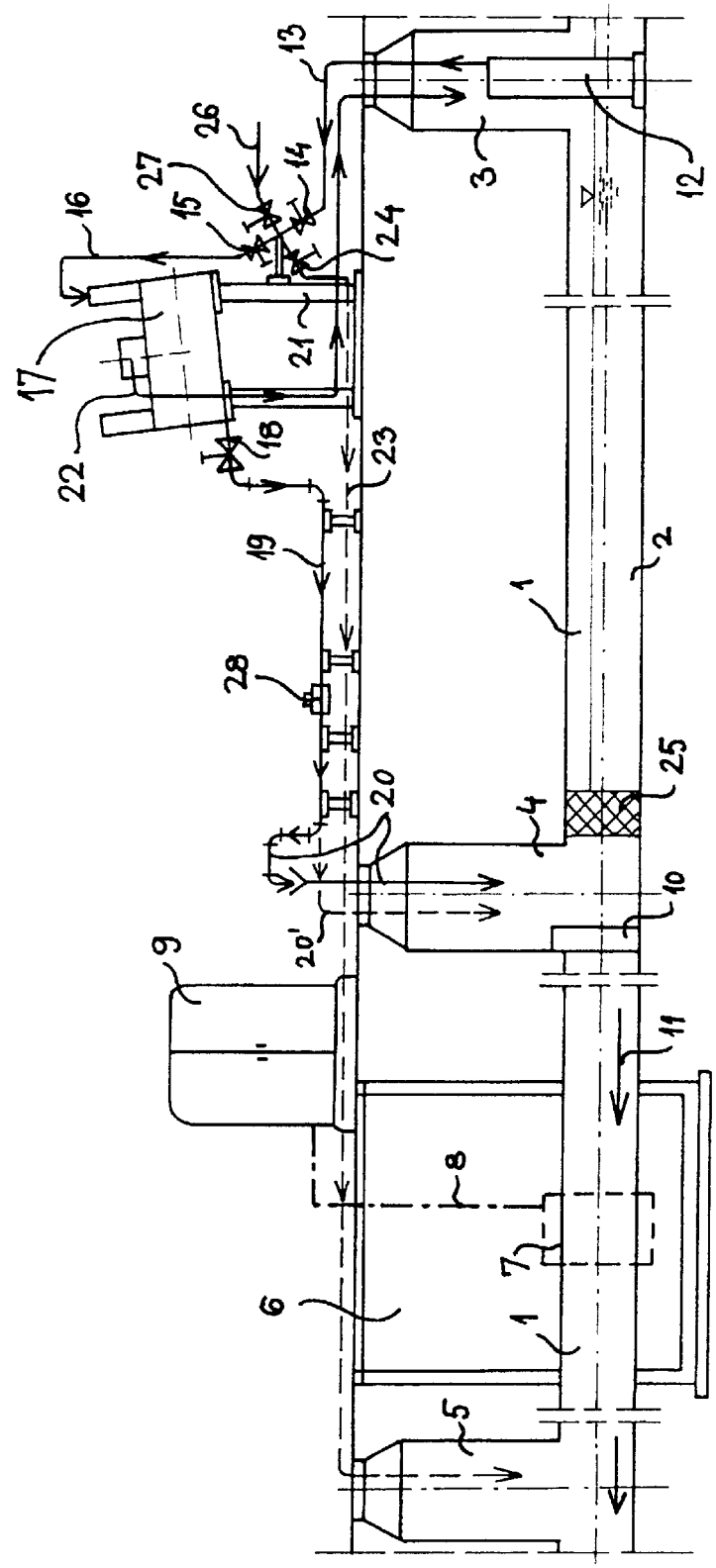
FIG. 1 illustrates a preferred realisation of the method in this invention by way of a connection diagram of a preferred embodiment of the apparatus as in this invention.

FIG. 1 illustrates an exemplified realisation of the method for in-situ calibration of quantity measurement of a fluid 2 flowing in a channel 1 by way of a preferred embodiment of the apparatus of this invention, wherein, channel 1 is a traditional sewage water channel, the fluid 2 flowing therein is sewage water. Channel 1 has shafts 3, 4, 5 mouthing out to the ground surface, and the amount of fluid 1 flowing in channel 1 is established by a flow-meter 7 arranged within a measuring shaft 6. The flow-meter 7 can be of any commercially available or known type (e. g. Parti-Mag II, induction flow-meter, Parshall-, Venturi-meter) which is traditionally able to measure sewage water flow and which is most suitable to given conditions in channel 1. Flow-meter 7 is connected via a signal conduit 8 to a box 9 containing the electronic units for local data registration, saving, documenting, preferably data forwarding, control of the operation of the system. Box 9 inhouses the electronic control circuits of these units as well as the control system of a washing equipment (not shown) of the flow-meter 7 and the high voltage power units of the whole system.

In this example, measuring shaft 6 containing flow-meter 7 is arranged between shafts 4 and 5 and, in direction of flow, before measuring shaft 6, at the mouth of shaft 4 into channel 1, a coarse bar screen 10 is provided to filter out the floated dirt with greater dimensions. Said coarse bar screen 10 is to be cleaned from time to time during the normal maintenance of channel 1.

Direction of flow within channel 1 is shown by an arrow 11. Seen in this direction, before shaft 4, a pump 12 sucking fluid 2 used later as measuring fluid out of channel 1 is arranged within shaft 3, the fluid flowing through a pipe 13, a valve 14, another valve 15 and a filler pipe 16 connected to valve 15 and through an inlet into a calibration tank 17. To an outlet of said calibration tank 17, a measuring conduit 19 is connected with the intermission of a draw-off valve 18, and the measuring conduit 19 terminals into a gravitational outflow pipe 20 arranged in the next shaft 4 being provided before measuring shaft 6.

Said calibration tank 17 is a calibrated working standard volume etalon certified previously by the measuring authority, the volume of which is officially proved by the certification with an accuracy as contained in the authenticated certification. Calibration tank 17 is arranged on a preferably mobile framework 21 allowing the quick and easy transport of calibration tank 17 to and form and its erection on the site of the measurement, most conveniently on the plateau of a transport vehicle. For the sake of secure emptying (total removal of the measuring fluid), the calibration tank 17 can be inclined towards draw-off valve 18. Calibration tank 17 has a usual spillway 22 terminaling into shaft 3.

The measuring arrangement has a by-pass 23 connected after valve 14 with the intermission of a valve 24 before filler pipe 16, and by-pass 23 terminals into shaft 5 arranged after measuring shaft 6.

In sense of the invention, the flow-meter 7 serving the quantity measurement of the fluid 2 flowing in channel 1 will be calibrated on the site of its operation. For this purpose, flow-meter 7 is first disconnected from the flow of fluid 2 which is solved by a provisional gate 25 arranged at the inlet of shaft 4 for sealingly blocking the channel I before the flow measuring means (flow-meter 7). Thereafter, fluid 2 will not flow through flow-meter 7. During this, calibration tank 17 will be filled with the measuring fluid, preferably by sucking up fluid 2 being the sewage water itself from channel 1 through pipe 13, opened valves 14 and 15, filler pipe 16 into calibration tank 17 by pump 12. However, if fluid 2 is not available in the necessary amount or its quality is disadvantageous, harmful or dangerous, it can be substituted or amended from a source of water shown at an arrow 26 through a valve 27 (e. g. from a water reservoir for fire extinction purposes on the site). If the flow rate of fluid 2 in channel I is to much, then the surplus amount not introduced into calibration tank 17 will be led away by opening valve 24 through by-pass 23 into channel 1 after flow-meter 7, preferably into shaft 5. Thus, the surplus amount of sewage water by-passes the whole measuring arrangement, and the sewage system can work as usual during the calibration as well.

During calibration, the whole measurement range of calibration tank 17 or the part of it being usable with regard to the hydraulic and metrologic characteristics of channel 1 as well as the usable flow speeds and flood wave shapes shall be determined which can be applied without exceeding the previously defined limit of surplus measurement deviancy resulting from the non-permanent nature of the flow in channel 1. In all other cases, namely, the surplus measurement deviancy would introduce not allowable measurement inaccuracy into the calibration process.

For the determination of the desired flow speeds and flood wave shapes, calibration tank 17 is to be emptied several times, the measuring fluid is to be flown after opening draw-off valve 18 through measuring conduit 19 and then though the portion of channel 1 being after shaft 4, further through flow-meter 7 in measuring shaft 6. With this experiments, the speed range of change of volume flow rate of fluid 2 streaming through flow-meter 7 will be determined, which is allowable for the specific flow-meter 7 used in the given measuring arrangement of the measurement site. With this, it is provided that during the in-situ calibration the flood wave with conventional true value of quantity is led through flow-meter 7 to be tested with a flood wave shape (volume flow rate in function of time) which results a relative surplus measurement deviancy only (as mentioned above) being significantly smaller than the magnitude of measurement uncertainty of flow-meter 7 to be tested (this very low measurement deviancy is expected to be produced by flow-meter 7 for the sake of calibratedly accurate operation of flow-meter 7). In this case, the calibration measurement process itself will not influence he measurement accuracy or uncertainty of flow-meter 7 to be tested.

On basis of the measurement plan edited according to the results of these experiments and characteristics as defined above, the whole conventional true value of quantity of the measuring fluid 2 is led through flow-meter 7 with the intermission of measuring conduit 19, shaft 4 and channel 1, and the measured values as shown in box 9 are red out. On basis of comparing the conventional true value of quantity to the measured value of volume, the measuring accuracy of flow-meter 7 is determined. After finishing the series of measurements according to the metrological corrections, methods and standards, the in-site calibration of flow-meter 7 is carried out.

In measuring conduit 19 of the embodiment of the invention as shown in FIG. 1, a travelling standard etalon flow meter 28 is arranged, the type and operation of which is per-se known. This etalon flow meter 28 can be used for controlling the flow conditions in measuring conduit 19 as well as for the calibration, especially in cases where this is well grounded by the hydrodynamical conditions of channel 1 and flow-meter 7 as well as by the conditions of feeding with measuring fluid 2.

In this case, first the etalon flow meter 28 built into measuring conduit 19 shall be calibrated on the site. For this purpose, the conventional true value of quantity of measuring fluid 2 is flown through etalon flow meter 28 out of calibration tank 17 by opening draw-off valve 18, and this amount is compared to the volume values shown by etalon flow meter 28. If the etalon flow meter 28 operates with opened surface, then an outflow pipe 20' shown with dotted lines, if it is a full-piped-type etalon flow meter 28, then the gravitational outflow pipe 20 will be used.

After the in-situ calibration of etalon flow meter 28, this flow measuring means will supply certified and correct values, thus, the certified true values needed for the calibration of flow-meter 7 shall not be gained from the emptying of calibration tank 17 but from the values red out on etalon flow meter 28. This expedites and quickens the in-situ calibration of flow-meter 7, especially in cases when extremely big volume of measuring fluid or many repeated measurements are necessary.

Figure 2:
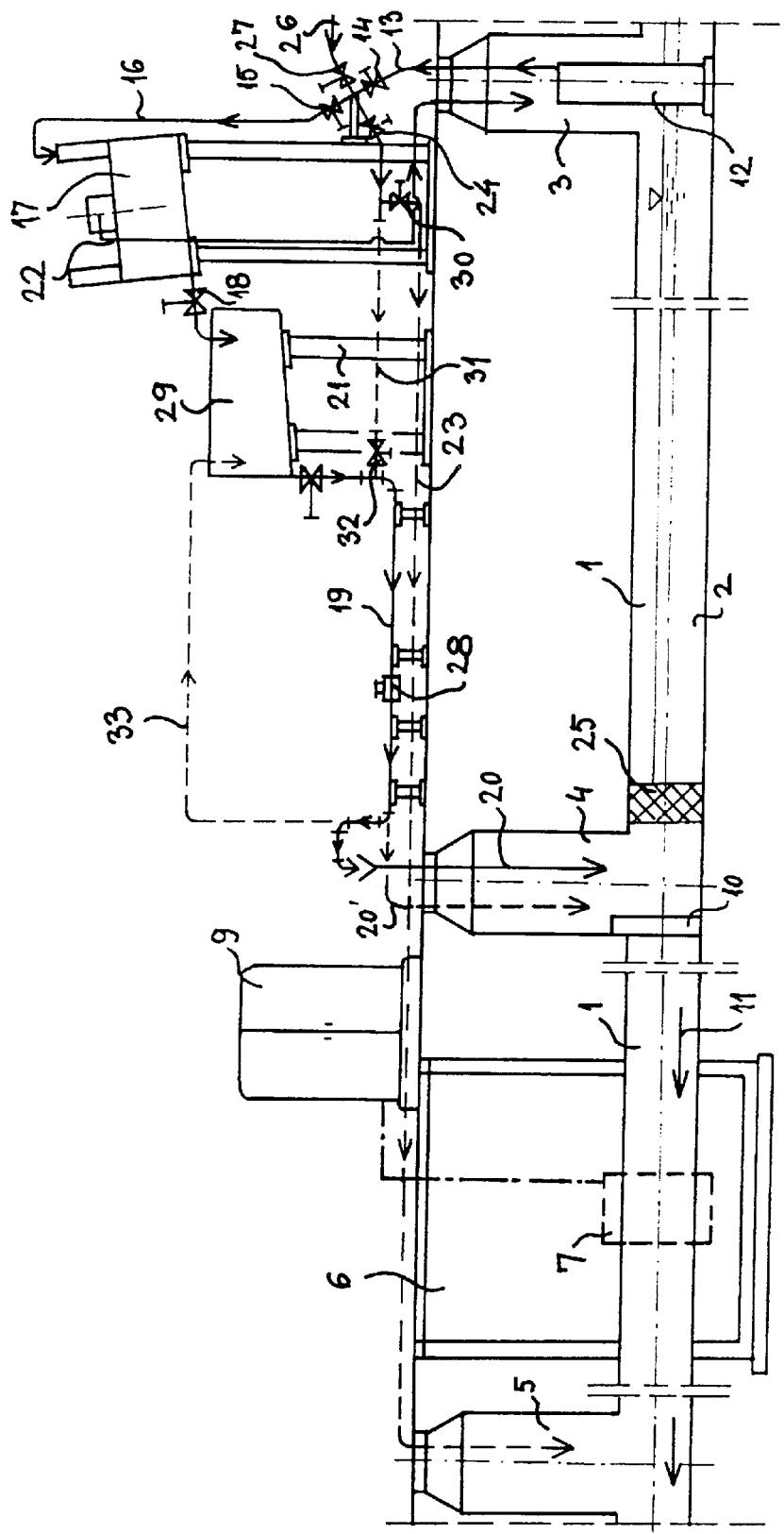
FIG. 2 is the same diagram as in FIG. 1 but for another embodiment.

FIG. 2 shows a realisation example of the method in this invention, wherein the through-flow of especially big volume of measuring fluid 2, e. g. a volume exceeding the volume capacity of calibration tank 17 is necessary for providing the desired and allowed flood wave shaped as described earlier. For this, an intermediate fluid reservoir 29 is arranged after calibration tank 17, so to say "in series" to it. Upper level of fluid reservoir 29 is lower then the outlet of calibration tank 17. The convential true value of quantity of measuring fluid needed for calibration is gathered in an amount being the whole number multiple of the volume of calibration tank 17 by emptying the full calibration tank 17 after opening draw-off valve 18 into fluid reservoir 29 for several times. After this, the calibration process (for flow-meter 7 as well as for etalon flow meter 28) is exactly the same as described in connection with FIG. 1.

After a control calibration of etalon flow meter 28, the filling of fluid reservoir 29 can be made simpler as well, since it can be completed not only though calibration tank 17. For this purpose, a filling pipe 31 is branched off at valve 30 from by-pass 23, which is connected through valve 32 into measuring conduit 19. The measuring fluid 2 flown by pump 12 will stream though etalon flow meter 28 built into measuring conduit 19 after opening valves 24 and 32 and (at least partially) closing of valve 30, and the measuring fluid will flow in a certified and measured amount into fluid reservoir 29 through a filling pipe 33. After gathering the necessary amount of measuring fluid 2, the calibration of flow-meter 7 may start, as described with FIG. 1.

Figure 3:
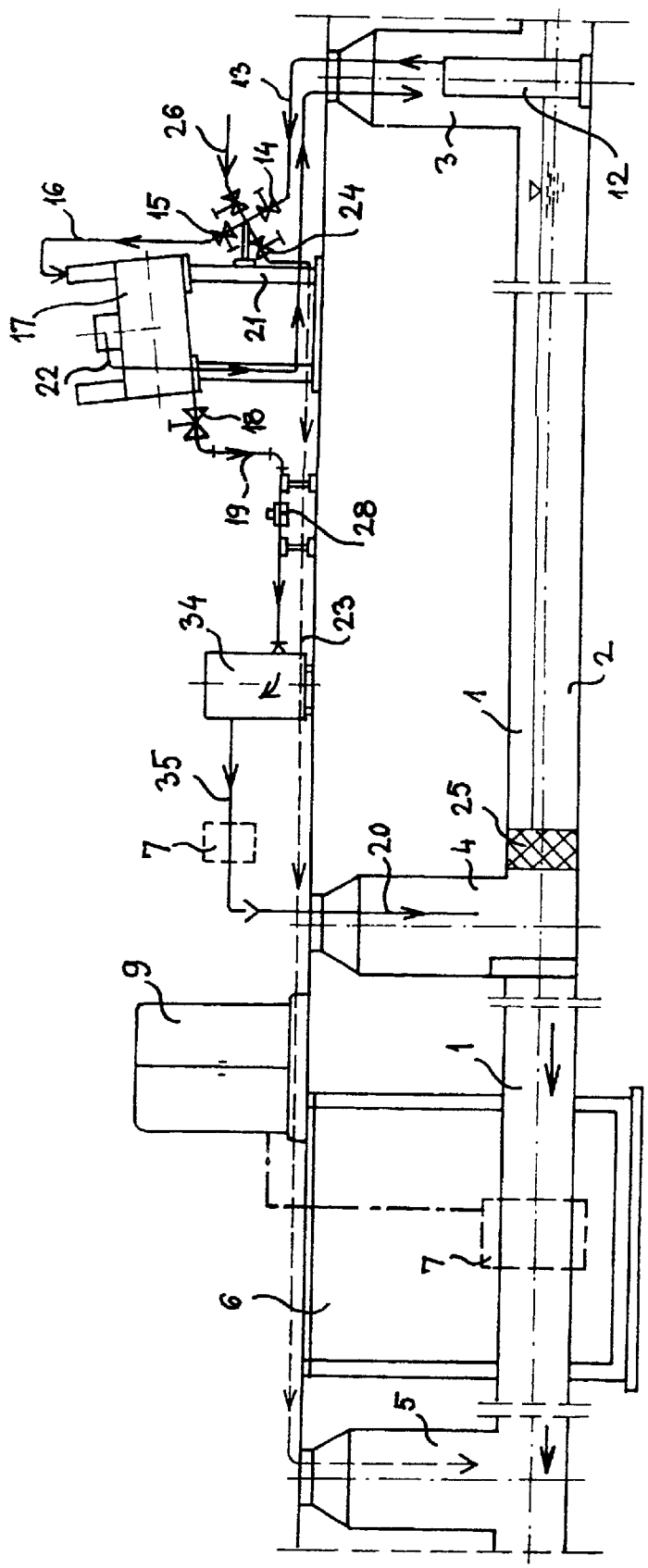
FIG. 3 is a connection diagram of still another embodiment.

The arrangement in FIG. 3 can be applied with channels having small cross sections and with flow-meter 7 having quick reaction times, if the channel I is deeply under the surface and the secure and tight arrangement, the mounting and removal of the provisional gate 25 in a sealed and economic manner are hindranced. In this case, an outflow tank 34 with opened surface is mounted into measuring conduit 19, to the spillway-type outlet of which a measuring section 35 is attached, within which the real hydrological conditions of channel 1 are modelled. Into this measuring section 35, flow-meter 7 removed from measuring shaft 6 is to be inserted. Outflow tank 34 is a mobile one, and as such, is part of the travelling equipment. It has the sole role to provide the same hydraulic conditions for flow-meter 7 as in channel 1. With this, a mobile laboratory is formed which can be transported and erected on the site of the measurement. The construction and operation of this embodiment is otherwise the same as that of the embodiment of FIG. 1. But this arrangement can be amended with intermediate fluid reservoir 29 and connection arrangement as shown in FIG. 2, as well.

Figure 4:
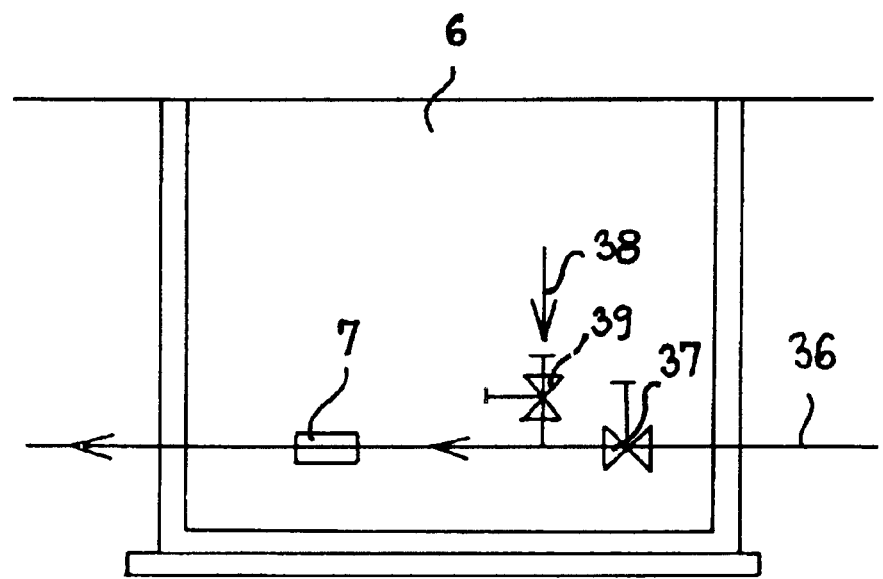
FIG. 4 shows a portion of the embodiment in FIG. 1: the measuring shaft for another embodiment.

FIG. 4 shows an embodiment, wherein the channel is formed as a pressure conduit 36, and the flow-meter 7 is a full-piped volume measuring means. In this, flow-meter 7 is disconnected from the flow of fluid 2 by slide valve 37, and the convential true value of quantity of measuring fluid is introduced from the calibration arrangement as shown in FIGS. I or 2, from measuring conduit 19 at an arrow 38, preferably under increased pressure, after opening a slide valve 39, onto flow-meter 7 to be calibrated. This quantity is then compared to the values red on flow-meter 7.

Figure 5:
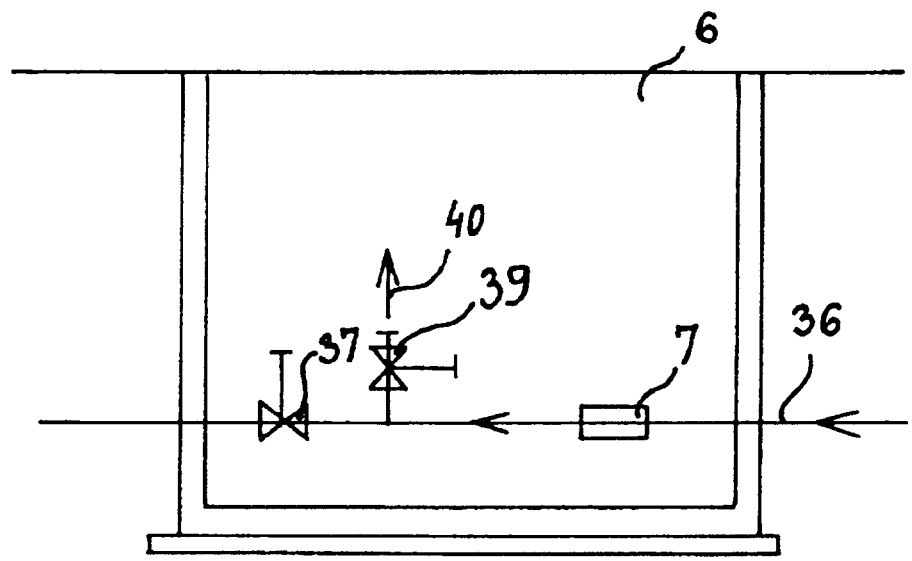
FIG. 5 shows the same portion as in FIG. 4 but for another embodiment.

In the embodiment as illustrated in FIG. 5, slide valve 39 of the measuring fluid is arranged after flow-meter 7, and this is followed by disconnecting slide valve 37. In this arrangement, the measurement is started after closing slide valve 37 and opening slide valve 39, whilst the fluid (sewage water) flown in pressure conduit 36 leaves as measuring fluid through slide valve 39 in direction of an arrow 40. Slide valve 39 is in connection with calibration tank 17. The measurement is ended when calibration tank 17 is totally full; the quantity gathered in calibration tank 17 is compared now with the values red on flow-meter 7.

Please consider, that the "reversed" operation as described with FIG. 5 is also feasible with the embodiments of FIGS. 1 to 3. In this case, measuring shaft 6 is before provisional gate 25 and shaft 3 sucking up the measuring fluid, and the calibration tank 17 is filed until reaching the conventional true value of quantity by the measuring fluid 2 flown by pump 12 through flow-meter 7. For the establishment of his, however, the exact amount of fluid in the portion of channel 1 between shaft 3 and provisional gate 25 is to be known.

The most important advantage of the solutions in this invention is apparent in the very simple and reliable in-situ calibration and certification of in-line flow-meter 7 serving as a flow measuring means of fluids flowing in channel 1 even with opened surface or with full-piped character, preferably with using the fluid 2 flown in channel 1 as measuring fluid, since with this, the flow measuring means of the natural water flows as well as that of the fluid conduits of large industrial sites can be made accurate and certified ones. With this, the certification and calibration requirements of the legal rules, the measuring authorities and the standards will be satisfied.

What is claimed is:

1. Method for in-situ calibration of quantity measurement of a fluid flowing in a channel, wherein the volume of the fluid flowing through is measured in a measuring means, wherein the measuring means of the volume of the fluid is disconnected from the fluid flow, measuring fluid is accumulated in a certified and pre-determined amount on site of the calibration, this certified and pre-determined amount of measuring fluid is led through the measuring means with a pre-determined volume flow, in the course of which the volume values measured by the measuring means are saved, then the measured volume values and the predetermined values of the fluid led through is compared to each other and, with this, the quantity measurement of the flowing fluid is calibrated, and wherein the measuring fluid is led through for more than one time, preferably under different flow velocities and flood wave shapes covering a whole measuring range of the measuring means, wherein a velocity range of the change of the volume flow of the flowing fluid permitted for the given measuring means in the given measuring arrangement is determined by experiments before start of the calibration.

2. Method for in-situ calibration of quantity measurement of a fluid flowing in a channel, wherein the volume of the fluid flowing through is measured in a measuring means, wherein the measuring means of the volume of the fluid is disconnected from the fluid flow, measuring fluid is accumulated in a certified and predetermined amount on site of the calibration, this certified and predetermined amount of measuring fluid is led through the measuring means with a predetermined volume flow, in the course of which the volume values measured by the measuring means are saved, then the measured volume values and the predetermined values of the fluid led through is compared to each other and, with this, the quantity measurement of the flowing fluid is calibrated, and wherein the fluid flowing in the channel is used as said measuring fluid, and this fluid is gathered in a previously certified measuring container.

3. Method for in-situ calibration of quantity measurement of a fluid flowing in a channel, wherein the volume of the fluid flowing through is measured in a measuring means, wherein the measuring means of the volume of the fluid is disconnected from the fluid flow, measuring fluid is accumulated in a certified and predetermined amount on site of the calibration, this certified and predetermined amount of measuring fluid is led through the measuring means with a predetermined volume flow, in the course of which the volume values measured by the measuring means are saved, then the measured volume values and the predetermined values of the fluid led through is compared to each other and, with this, the quantity measurement of the flowing fluid is calibrated, and wherein the fluid flowing in the channel is used as said measuring fluid is at least partially substituted or completed by a fluid being available on site of the calibration.

4. Method for in-situ calibration of quantity measurement of a fluid flowing in a channel, wherein the volume of the fluid flowing through is measured in a measuring means, wherein the measuring means of the volume of the fluid is disconnected from the fluid flow, measuring fluid is accumulated in a certified and predetermined amount on site of the calibration, this certified and predetermined amount of measuring fluid is led through the measuring means with a predetermined volume flow, in the course of which the volume values measured by the measuring means are saved, then the measured volume values and the predetermined values of the fluid led through is compared to each other and, with this, the quantity measurement of the flowing fluid is calibrated, and wherein the flow of the measuring fluid is controlled or determined by a certified etalon flow-meter before leading the fluid through the measuring means.

5. The method as claimed in claim 4, wherein the etalon flow-meter is previously calibrated and certified by flowing through the measuring fluid in a certified standard real volume.

6. Apparatus for in-situ calibration of quantity measurement of a fluid flowing in a channel, wherein a flow-meter measuring the volume of the flowing fluid is arranged in a measuring shaft, and the flow-meter is coupled to a data collection unit, wherein the apparatus further comprises a calibration tank (17) having an officially certified volume and being erected on site of the measurement, said calibration tank (17) being connected to a source of a measuring liquid as well, at its outlet, to a measuring conduit (19) discharging into said channel (1) before the flow-meter (7) seen in direction of flow of liquid within the channel (1), before calibration, the calibration tank (17) contains measuring fluid in a predetermined and certified amount, and the measuring conduit (19) has at least one draw-off valve means for controlling the flow of the measuring fluid in a certified way.

7. An apparatus as claimed in claim 6, wherein the channel (1) has a provisional gate (25) for sealingly blocking the channel (1) for the time of calibration before the flow-meter (7) seen in direction of flow of liquid within the channel (1).

8. An apparatus as claimed in claim 7, wherein a by-pass conduit (23) is provided to pass by the gate (25) and the measuring shaft (6).

9. An apparatus as claimed in claim 7, wherein a collection reservoir is provided between the calibration tank and the measuring conduit.

10. An apparatus as claimed in claim 7, wherein an etalon flow-meter is arranged in the measuring conduit.

11. An apparatus as claimed in claim 10, wherein the etalon flow-meter (28) is in direct connection with a source of the measuring liquid with the intervention of at least one filler valve (24).

12. An apparatus as claimed in claim 10, wherein the measuring conduit has a free surface downstream tank for outflow after the etalon flow-meter seen in direction of flow of the liquid.

13. An apparatus as claimed in claim 12, wherein the flow-meter (7) removed from the measuring shaft (6) is mounted into a measuring pipe (35) after the free surface downstream tank, and the measuring pipe (35) has the same hydraulic parameters as the channel (1).

14. An apparatus as claimed in claim 7, wherein a full-piped measuring means is provided and the channel is formed as a pressure conduit and a slide valve disconnecting the measuring means out of the pressure conduit is arranged before the measuring means, and connection fitting introducing the measuring liquid into the pressure conduit, preferably under pressure is provided between the slide valve and the measuring means.

15. An apparatus as claimed in claim 7, wherein a full-piped measuring means is provided and the channel is formed as a pressure conduit and a slide valve disconnecting the measuring means out of the pressure conduit is arranged after the measuring means, and connection fitting introducing the measuring liquid into the pressure conduit, preferably under pressure is provided between the slide valve and the measuring means.

* * * * *